United States Patent [19]

Bowers et al.

[11] Patent Number: 5,051,841
[45] Date of Patent: Sep. 24, 1991

[54] PROCESS FOR PROVIDING DIGITAL HALFTONE IMAGES WITH RANDOM ERROR DIFFUSION

[75] Inventors: Harry Bowers, Berkeley; John S. Bowers, San Francisco, both of Calif.

[73] Assignee: Bowers Imaging Technologies, Inc., South San Francisco, Calif.

[21] Appl. No.: 421,931

[22] Filed: Oct. 16, 1989

[51] Int. Cl.⁵ .................................................. H04N 1/40
[52] U.S. Cl. ................................. 358/447; 358/455; 358/458; 358/463
[58] Field of Search ............. 358/457, 298, 455, 458, 358/459, 463, 447; 382/22, 50, 56, 55; 364/518

[56] References Cited

U.S. PATENT DOCUMENTS

| | | | |
|---|---|---|---|
| 3,977,007 | 8/1976 | Berry et al. | 346/1 |
| 4,032,978 | 6/1977 | Wong | 358/283 |
| 4,280,144 | 7/1981 | Bacon | 358/280 |
| 4,339,774 | 7/1982 | Temple | 358/283 |
| 4,345,313 | 8/1982 | Knox | 364/515 |
| 4,393,452 | 7/1983 | Sekigawa | 364/514 |
| 4,449,150 | 5/1984 | Kato | 358/456 |
| 4,470,065 | 9/1984 | Reitmeier | 358/21 R |
| 4,544,922 | 10/1985 | Watanabe et al. | 340/728 |
| 4,569,081 | 2/1986 | Mintzer et al. | 382/47 |
| 4,578,713 | 3/1986 | Tsao et al. | 358/283 |
| 4,587,621 | 5/1986 | DuVall | 364/577 |
| 4,595,948 | 6/1986 | Itoh et al. | 358/75 |
| 4,610,026 | 9/1986 | Tabata et al. | 382/47 |
| 4,611,349 | 9/1986 | Hou | 382/47 |
| 4,616,268 | 10/1986 | Shida | 358/287 |
| 4,628,534 | 12/1986 | Marshall | 382/41 |
| 4,631,751 | 12/1986 | Anderson et al. | 382/47 |
| 4,633,503 | 12/1986 | Hinman | 382/47 |
| 4,635,078 | 1/1987 | Sakurada et al. | 346/140 R |
| 4,651,287 | 3/1987 | Tsao | 364/519 |
| 4,654,721 | 3/1987 | Goertzel et al. | 358/283 |
| 4,656,664 | 4/1987 | Anderson et al. | 382/47 |
| 4,661,987 | 4/1987 | Anderson et al. | 382/41 |
| 4,673,971 | 6/1987 | Ikuta et al. | 358/75 |
| 4,680,645 | 7/1987 | Dispoto et al. | 358/298 |
| 4,686,580 | 8/1987 | Kato et al. | 358/287 |
| 4,700,235 | 10/1987 | Gall | 358/283 |
| 4,733,230 | 3/1988 | Kurihara et al. | 340/728 |
| 4,734,786 | 3/1988 | Minakaea et al. | 358/287 |
| 4,736,254 | 4/1988 | Kotera et al. | 358/283 |
| 4,742,400 | 5/1988 | Tsuji | 358/284 |
| 4,752,822 | 6/1988 | Kawamura | 358/80 |
| 4,771,473 | 9/1988 | Sugiura | 382/47 |
| 4,890,167 | 12/1989 | Nakazato et al. | 358/443 |
| 4,891,714 | 1/1990 | Klees | 358/456 |
| 4,924,322 | 5/1990 | Kurosawa et al. | 358/448 |
| 4,958,238 | 9/1990 | Katayama et al. | 358/456 |
| 4,969,052 | 11/1990 | Ishida et al. | 358/457 |

OTHER PUBLICATIONS

IBM Technical Disclosure Bulletin, vol. 23, No. 10, issued Mar. 1981, (S. J. Fox et al.), "Multiple Error Correction Algorithm for Halftone, Continuous Tone and Text Reproduction".

*Primary Examiner*—Edward L. Coles, Sr.
*Attorney, Agent, or Firm*—Burns, Doane, Swecker & Mathis

[57] ABSTRACT

An error diffusion process for eliminating visually-perceptible artifacts in images reproduced by digital halftone printing.

15 Claims, 1 Drawing Sheet

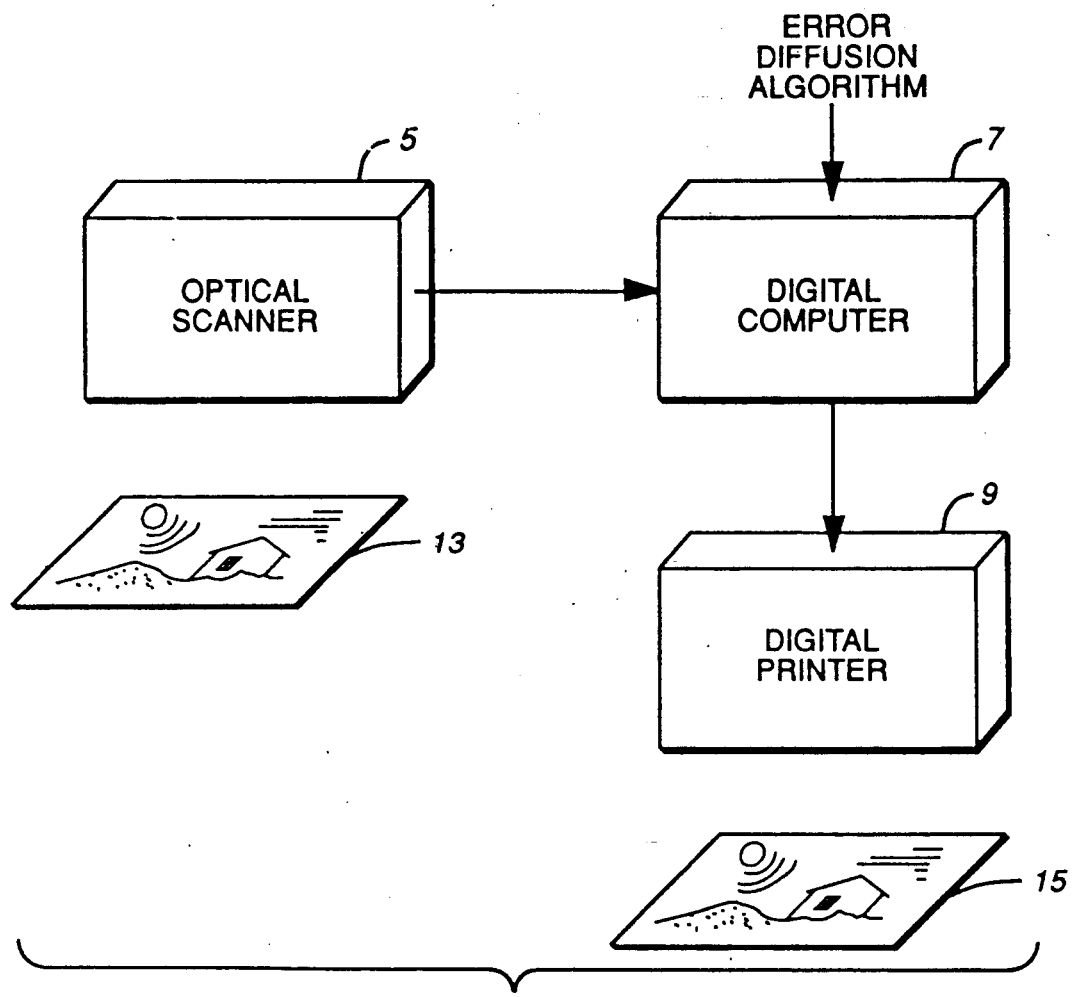
FIG._1
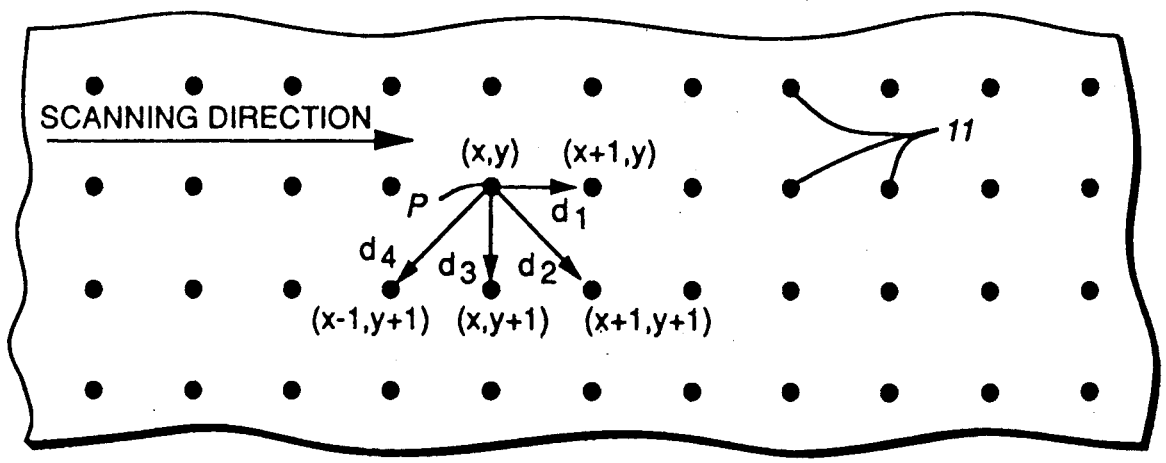
FIG._2

PROCESS FOR PROVIDING DIGITAL HALFTONE IMAGES WITH RANDOM ERROR DIFFUSION

BACKGROUND OF THE INVENTION

1. Field of the Invention

The present invention generally relates to a method for reproducing images by digital half-toning and, more particularly, to a reproduction method based upon digital halftoning with error diffusion.

2. State of the Art

In conventional halftone printing, picture elements, or pixels, of a continuous-tone image are converted to dots whose diameters vary in size according to the amplitude of light penetrating a screen. More particularly, the dots are larger where more light penetrates a screen and are smaller where less light is present. Thus, conventional halftone printing processes can be described as being of the analog type since in the processes, dot size is the analog of color intensity for individual picture elements of an original image.

To reproduce multi-color images from continuous-tone originals by conventional halftone printing, a color-filtered screen is prepared for each of four primary colors. Then the colors are printed sequentially while maintaining precise mechanical registration of the screens. Although conventional halftone printing can produce excellent results, the processes involve economies-to-scale and are relatively expensive for short production runs.

Digital halftone printing, in contrast to conventional halftone printing, is better suited for shorter production runs. In digital halftone printing, the initial step is to scan an image with an optical scanner that detects light intensity values for selected colors. Then for each pixel location, the detected data are converted to gray-scale values to provide a basis for image reproduction. Typically, gray-scale values range from 0 to 255.

More particularly, in digital halftone printing, dots are printed in areas corresponding in scale to the original pixel locations. The printed dots normally are of fixed size, but their placement and density within the printed areas are varied in accordance with the detected gray-scale values. Thus, in images that have been produced by digital halftone printing, dot density within each printed area determines the spatial resolution and perceived grayness of the area to an observer.

One shortcoming of conventional digital halftone printing is that printed images often have a grainy or "noisy" appearance. To reduce the grainy appearance of digital halftone images and to improve detail resolution, it has been suggested to use error diffusion techniques in conjunction with digital halftone printing. For example, the text *Digital Halftoning*, by Robert Ulichney (MIT Press, 1987), .265-268, describes error diffusion techniques with perturbation. Those particular error diffusion techniques are sometimes referred to as spatial dithering.

To apply error diffusion techniques to digital halftone printing, gray-scale values at detected pixel locations are binary coded. Typically, the binary coding threshold is 127, i.e., halfway between the minimum and maximum gray-scale values The binary number "1", for instance, can be assigned to pixel locations where detected gray-scale values are less than 127, and the binary number "0" can be assigned to pixel locations where detected gray-scale values are 127 or more.

As an example of binary coding for error diffusion in digital halftoning, a pixel location with a detected gray-scale value of 100 would be coded as a binary "1". Similarly, a pixel location with a gray-scale value of 145 would be coded as a binary "0". In monochrome printing systems, a pixel location encoded as a binary "1" generally is black, and a pixel encoded as a binary "0" generally is white.

The above-described coding techniques for digital halftoning with error diffusion inherently result in coding errors for each pixel location having a gray-scale value other than 0 or 255. For instance, the magnitude of the coding error resulting from binary encoding a pixel location having a gray-scale value of 100 would be 100 units as measured by gray-scale values. Similarly, the magnitude of the coding error for binary encoding of a pixel location having a gray-scale value of 110 would be 110 units as measured by gray-scale values.

The basic concept underlying digital halftone printing with error diffusion is to distribute, or diffuse, coding errors from the locations at which the errors arise. This concept is further discussed in an article, entitled "An Adaptive Algorithm for Spatial Greyscale", R. W. Floyd and L. Steinberg, Proc. SID, vol. 17/2, pp. 75–77 (1976). Various algorithms have been proposed to accomplish error diffusion.

Although images produced by digital halftone printing with conventional error diffusion techniques may not have a grainy appearance, the printed images often contain discernible patterns. Such patterns are often referred to as "artifacts." Artifacts sometimes appear as straight lines and at other times as wiggly or worm-like shapes. At still other times, artifacts have a random, pebble-like appearance. Regardless of their particular form or shape, however, artifacts detract from the appearance of printed images and therefore limit the commercial usefulness of digital halftoning.

SUMMARY OF THE INVENTION

Generally speaking, the present invention provides an improved error diffusion process for eliminating visually-perceptible artifacts in images reproduced by digital halftone printing. In the preferred embodiment, the error diffusion process includes the steps of:

scanning an image to detect intensity values at selected pixel locations;

encoding selected ones of the pixel locations as one binary value when the detected intensity value at a location is less than a predetermined threshold value, and calculating error values for such pixel locations that equal the detected intensity values;

encoding selected other ones of the pixel locations as a second binary value when the detected intensity values at those locations are greater than the predetermined threshold value, and calculating error values for those locations that equal the detected intensity values less the upper limit of the intensity scale;

for selected pixel neighbors of the ith pixel in an image, diffusing the calculated error value, $E_i$, of the ith pixel location to its selected neighbors as follows:

$$e_j = (w_j) E_i$$

where $e_j$ is the error value diffused to the jth pixel neighbor from the ith pixel location, where the jth pixel neighbor is randomly determined from a predetermined set of pixels neighboring the ith pixel, and where $w_j$ is a weighting factor determined for the jth pixel location;

continuing the error diffusion process for the other pixel neighbors of the ith pixel location;

continuing the error diffusion process for the (i+1)th pixel location and so forth, such that coding errors are diffused from substantially all of the pixel locations in a scanned image; and printing images by digital halftone printing based upon intensity values of pixel locations that have been modified by error diffusion.

Generally speaking, it is preferred that the predetermined set of neighbor pixels comprises pixels that are immediately adjacent neighbors to a selected ith pixel location. More particularly, it is preferred that the predetermined set of neighbor pixels comprises the pixel that immediately follows a selected ith pixel location, a pixel immediately below the selected ith pixel location, and the pixels that immediately precede and follow the pixel immediately below the selected ith pixel location.

Further in the preferred embodiment, the weights for the jth and subsequent pixel locations are determined as follows:

a) for the first randomly chosen adjacent neighbor pixel, assigning a weight $w_{di}$ which is randomly selected from a distribution of numbers between 0.0 and 1.0;

b) for the second chosen adjacent neighbor pixel, assigning a weight $w_{dj}$ which is randomly selected from a distribution of numbers between 0.0 and $(1.0 - w_{di})$;

c) for the third randomly chosen adjacent neighbor pixel, assigning a weight $w_{dk}$ which is randomly selected from a distribution of numbers between 0.0 and $(1.0 - w_{di} - w_{dj})$; and d) for the last remaining pixel of said set, assigning a weight $w_{dl}$ to it where $$w_{dl} = 1 - w_{di} - w_{dj} - w_{dk}.$$

BRIEF DESCRIPTION OF THE DRAWING

The present invention can be further understood by reference to the following description and attached drawing which illustrates the preferred embodiment. In the drawing, FIG. 1 is a functional block diagram of a digital halftoning system which operates according to the process of the present invention; and FIG. 2 schematically shows a field of pixels and is offered as an aid to the description of the error diffusion process of the present invention.

DESCRIPTION OF THE PREFERRED EMBODIMENTS

FIG. 1 generally shows a system for digital halftone printing. The components of the system comprise an optical image scanner 5, a general purpose digital computer 7, and a digital printer 9. The illustrated components are conventional, but by employing the method of the present invention, the components operate in the system to eliminate the appearance of artifacts in images printed by digital halftoning with error diffusion.

In normal operation of the system of FIG. 1, scanner 5 makes color separations of an image from a medium 13 such as a photographic transparency, a photographic print, or a high-resolution printed original. For each of the separated colors, the picture elements (i.e., pixels) of the original image are digitized to gray-scale values. Then the digitized values are provided to digital computer 7. Within computer 7, the digital information can be processed with conventional graphics software so that images can be retouched, adjusted, recomposed, and so forth. Then the processed images are provided to digital printer 9 for printing onto a sheet 15 by the techniques of conventional digital halftone printing.

When the system of FIG. 1 is operated in accordance with the present invention, the digital image information that is provided to computer 7 is also binary encoded and then is operated upon according to the halftoning process of the present invention to provide error diffusion prior to printing. The object of the error diffusion process of the present invention is to create reproducible images that provide the illusion of a continuous-tone image without discernible artifacts.

An error diffusion process according to the present invention will now be described with reference to FIG. 2. In FIG. 2, each dot 11 in the field should be understood to represent one pixel location on an image which is presented for optical scanning. For purposes of discussion, it can be assumed that scanning proceeds from left to right across each pixel row and sequentially, row by row, from the top to the bottom of the field. Such a scanning pattern can be described as a raster-type scanning pattern. Other scanning patterns, however, might be used; for example, scanning can proceed from left to right across one row of pixels, then in the opposite direction across the next lower row, and so forth in a serpentine pattern.

The location of each pixel 11 in the field in FIG. 2 can be described by cartesian coordinates; accordingly, an arbitrary pixel "P" is designated as having location (x,y). Because pixel P is in the interior of the field, it has eight immediately-adjacent pixel neighbors. When the pixel field is scanned in a raster-type manner, four of the immediately-adjacent neighboring pixels will be scanned before pixel P, and four will be scanned after pixel P.

In FIG. 2, the pixel to the immediate right of pixel P is designated by arrow $d_1$, the pixel diagonally below pixel P in the scanning direction is designated by arrow $d_2$, the pixel directly below pixel P is designated by arrow $d_3$, and the pixel diagonally below pixel P in the direction opposite the scanning direction is designated by the arrow $d_4$. Thus, the pixel designated by arrow $d_1$ can be described as having cartesian coordinates (x+1,y), and the pixel designated by arrow $d_2$ can be described as having coordinates (x+1,y+1). Likewise, the pixel designated by arrow $d_3$ can be described as having coordinates (x,y+1), and, finally, the pixel designated by arrow $d_4$ can be described as having coordinates (x-1,y+1). The set of directions $d_1$ through $d_4$ is herein called the "direction set".

For purposes of discussion, the error diffusion process of the present invention will be described as beginning at pixel P in FIG. 2. Further for purposes of discussion, the magnitude of the detected gray-scale value of pixel P will be described as an arbitrary number "z" which is between 0 and 255, inclusive. Still further, the coding error for any pixel location in the field will be referred to as $E_{x,y}$ where the subscripts identify the cartesian coordinates of the pixel.

When a pixel at a given location (x,y) has a value z that lies between a threshold value T and the maximum gray-scale value (e.g., 255), the magnitude of the encoding error $E_{x,y}$ will be a negative number equal to z minus 255 gray-scale units; that is, $$E_{x,y} = z - 255 \text{ for } z \geq T.$$

When the pixel value z is a number between 0 and the threshold value, the magnitude of the encoding error is simply equal to the value z in gray-scale units; that is, $E_{x,y} = z$ for $z \leq T$.

The selected threshold value T is usually a number about midway along the selected gray-scale and typically equals 128. Although the threshold value usually is held constant, it could be randomly varied, or dithered, in a relatively narrow range about a chosen central value (e.g., 128). In that case, further randomness would be introduced into the error diffusion process that will be described below.

In the preferred embodiment of an error diffusion process according to the present invention, coding errors are randomly diffused from each given pixel location to four immediately-adjacent neighboring pixel locations that are scanned after the given pixel location. More particularly, for each pixel location from which coding error is diffused, a random choice is made of the order in which errors are to be diffused to the immediately-adjacent neighbors of the pixel location under consideration; that is, the order of directions within the direction set are randomly selected. For purposes of the following discussion, the directions from pixel P to the four immediately-adjacent pixel neighbors that are scanned after pixel P are designated as directions $d_i$, $d_j$, $d_k$, and $d_l$ to emphasize that the directions are randomly assigned. To provide random assignments within the direction set, it is usually convenient to use a sequencing look-up table containing about several thousand random numbers.

Further in the preferred embodiment of an error diffusion process according to the present invention, after direction assignments are randomly determined within a direction set, a first direction $d_i$ is assigned a weighting factor $w_{di}$ where the value of the weighting factor is randomly chosen from a uniform distribution of weights between 0.0 and 1.0. Next, a second randomly chosen direction $d_j$ is assigned a weighting factor $w_{dj}$ where the value of the weighting factor is randomly chosen from a uniform distribution of weights between 0.0 and $(1.0 - w_{di})$. Next, the third randomly selected direction $d_k$ is assigned a weighting factor $w_{dk}$ where the value of the weighting factor is randomly chosen from a uniform distribution of weights between 0.0 and $(1.0 - w_{di} - w_{dj})$. Finally, the remaining direction $d_l$ is assigned a weighting factor $w_{dl}$ such that $w_{dl} = 1 - w_{di} - w_{dj} - w_{dk}$. Thus, it may be noted that:

$w_{di} + w_{dj} + w_{dk} + w_{dl} = 1$.

As mentioned above, pseudo-random weights $w_{di}$, $w_{dj}$, $w_{dk}$, and $w_{dl}$ are used to propagate, or spread, coding errors to the four immediately-adjacent neighbors of each scanned pixel location. For convenience of expression, the propagated error values are designated herein as $e_1$, $e_2$, $e_3$, and $e_4$ to designate the error values which are distributed to pixel locations $(x+1,y)$, $(x+1,y+1)$, $(x,y+1)$, and $(x-1,y+1)$, respectively. Also, for convenience it can be assumed that weighting factor $w_{di}$ is associated with error $e_1$, that weighting factor $w_{dj}$ is associated with error $e_2$, that weighting factor $w_{dk}$ is associated with error $e_3$, and that weighting factor $w_{dl}$ is associated with error $e_4$.

According to the foregoing, the error value $e_1$ which is to be propagated to the pixel located at $(x+1,y)$ from the pixel located at $(x,y)$ is determined by multiplying the weighting factor $w_{di}$ by the encoding error for pixel P; that is, $e_1 = (w_{di})(E_{x,y})$. Likewise, the error $e_2$ propagated to the pixel located at $(x,y+1)$ is $e_2 = (w_{dj})(E_{x,y})$, and the error $e_3$ propagated to the pixel located at $(x+1,y+1)$ is $e_3 = (w_{dk})(E_{x,y})$. Finally, the error $e_4$ propagated from pixel P to the pixel located at $(x-1,y+1)$ is $e_4 = (w_{dl})(E_{x,y})$. Collectively, the error values $e_1$, $e_2$, $e_3$, and $e_4$ can be understood to be pseudo-randomized error values. It should be noted that those propagated error values can be either positive or negative.

As a result of coding error being diffused, gray-scale values of pixel located are increased, or decreased. For example, after error diffusion from pixel P at location $(x,y)$, the gray-scale value imputed to the location $(x+1,y)$ would be the detected gray-scale value for that location plus the propagated error $e_1$. Likewise, the gray-scale value imputed to the pixel located at $(x+1,y+1)$ would be the detected gray-scale value for that pixel location plus the propagated error $e_2$. The effects of the error diffusion process on the pixel neighbors of pixel P in this example can be summarized as follows:

$\text{pixel}'_{(x+1,y)} = \text{pixel}_{(x+1,y)} + e_1$ $\text{pixel}'_{(x+1,y+1)} = \text{pixel}_{(x+1,y+1)} + e_2$ $\text{pixel}'_{(x+1,y+1)} = \text{pixel}_{(x,y+1)} + e_3$ and $\text{pixel}'_{(x+1,y+1)} = \text{pixel}_{(x-1,y+1)} + e_4$ where the primes indicate that the gray-scale values of the pixel locations are updated as a result of the above-described error diffusion process.

It should be emphasized that the above-described error diffusion process continues for each successively scanned pixel location. For example, as a result of the error diffusion process, the gray-scale value for the pixel located at $(x+4,y+5)$ will reflect the error propagated from its neighboring pixels located at $(x+3,y+4)$, $(x+4,y+4)$, $(x+5,y+4)$, and $(x+3,y+4)$. Also, the binary coding error propagated from the pixel location $(x+4,y+5)$ will reflect the errors propagated to that location from its set of neighboring pixels, and that error, in turn, will be weighted by the above-described pseudo-random process and then will be diffused to the pixels located at $(x+5,y+5)$, $(x+5,y+6)$, $(x+4,y+6)$, and $(x+3,y+6)$.

For multi-color halftone printing, a field such as that shown in FIG. 2 can be sequentially scanned with different color filters or, alternatively, can be scanned once with each picture element having multiple exposures, with different filters. Then for each of the selected colors and each of the pixel locations in the scanned field, binary coding errors are diffused as described above. Multi-color images without discernible artifacts can then be printed by conventional digital halftone printing procedures.

For either monochrome or multi-color halftone printing, the above-described process can be summarized by the following algorithm:

1) for selected pixel neighbors of the ith pixel location, diffuse the error value $E_i$ of the ith pixel as follows:

$e_j = (w_j)E_i$ where $e_j$ is the error value diffused to the jth pixel location from the ith pixel location, where the jth pixel location is randomly determined from the predetermined set of pixels neighboring the ith pixel location, and where $w_j$ is the weighting factor determined for the jth pixel location according to the procedures described above;

2) continue the error diffusion process for the other pixel neighbors of the ith pixel location; and 3) continue the error diffusion process for the (i+1)th pixel location, and so forth.

Although the preferred embodiments of the process of the present invention has been described, those skilled in the art will appreciate that additions, modifications, substitutions and deletions not specifically described in the foregoing may be made to the preferred embodiment of the process. For example, diffusion directions can be chosen other than the above-discussed set of four directions. Moreover, it is not necessary for the present invention that error be diffused to only immediately-adjacent pixel neighbors. Accordingly, the above-described embodiments should be regarded as illustrative rather than restrictive, and it should be appreciated that workers skilled in the art may make variations in those embodiments without departing from the spirit or scope of the present invention as defined by the following claims.

What is claimed is:

1. A digital halftoning process with random error diffusion for reducing visually apparent artifacts in images that are produced by digital halftone printing, comprising the steps of:

scanning an image to detect intensity values at selected pixel locations;

encoding selected ones of the pixel locations as one binary value when the detected intensity value at a location is less than a predetermined threshold value, and calculating error values for such pixel locations that equal the detected intensity values;

encoding selected other ones of the pixel locations as a second binary value when the detected intensity values at those locations are greater than the predetermined threshold value, and calculating error values for those locations that equal the detected intensity values less the upper limit of the intensity scale;

for selected pixel neighbors of the ith pixel in an image, diffusing the calculated error value, $E_i$, of the ith pixel location to its selected neighbors as follows:

$$e_j = (w_j) E_i$$

$e_j$ is the error value diffused to the jth pixel neighbor from the ith pixel location, where the jth pixel neighbor is randomly determined from a predetermined set of pixels neighboring the ith pixel, and where $w_j$ is a weighting factor determined for the jth pixel location;

continuing the error diffusion process for the other pixel neighbors of the ith pixel location;

continuing the error diffusion process for the (i+1)th pixel location and so forth, such that coding errors are diffused from substantially all of the pixel locations in a scanned image; and printing images by digital halftone printing based upon intensity values of pixel locations that have been modified by error diffusion.

2. A digital halftoning process according to claim 1 wherein the predetermined set of neighbor pixels comprises pixels that are immediately adjacent neighbors to a selected ith pixel location.

3. A digital halftoning process according to claim 2 wherein the predetermined set of neighbor pixels comprises the pixel that immediately follows a selected ith pixel location, a pixel immediately below the selected ith pixel location, and the pixels that immediately precede and follow the pixel immediately below the selected ith pixel location.

4. A digital halftoning process according to claim 1 wherein the selected threshold value is a number about midway along the selected intensity scale.

5. A digital halftoning process according to claim 4 wherein the selected threshold value is a constant.

6. A digital halftoning process according to claim 4 wherein the selected threshold value is randomly varied in a relatively narrow range about a chosen central value.

7. A digital halftoning process according to claim 1 wherein for each pixel location from which coding error is diffused, a random choice is made of the order in which the errors are diffused to immediately-adjacent neighbors of the pixel location under consideration.

8. A digital halftoning process according to claim 7 wherein the set of immediately-adjacent neighbors for each selected pixel location comprises four immediately-adjacent neighboring pixel locations.

9. A digital halftoning process according to claim 8 wherein the order of pixel locations within the predetermined set is randomly selected.

10. A digital halftoning process according to claim 1 wherein the weighting factors are determined as follows:

for the first randomly chosen adjacent neighbor pixel, assigning a weighting factor $w_{di}$ which is randomly selected from a distribution of numbers between 0.0 and 1.0;

for the second chosen adjacent neighbor pixel, assigning a weighting factor $w_{dj}$ which is randomly selected from a distribution of numbers between 0.0 and $(1.0 - w_{di})$;

for the third randomly chosen adjacent neighbor pixel, assigning a weighting factor $w_{dk}$ which is randomly selected from a distribution of numbers between 0.0 and $(1.0 - w_{dj})$; and for the last remaining pixel of said set, assigning a weighting factor $w_{dl}$ where $$w_{dl} = 1 - w_{di} - w_{dj} - w_{dk}.$$

11. A digital halftoning process with random error diffusion for reducing visually apparent artifacts in images that are produced by digital halftone printing, comprising the steps of:

scanning an image to detect intensity values at selected pixel locations;

for a first selected pixel location, encoding the pixel location as one binary value when the detected intensity value at the location is less than a predetermined threshold value, and assigning an error value to the pixel location equal to the detected intensity value;

when the detected intensity value at the first selected pixel location is greater than the threshold value, encoding the pixel location as a second binary value and calculating an error value for that location that equals the detected intensity value less the upper limit of the intensity scale;

randomly choosing a first neighbor to the first pixel location from a predetermined set of neighboring pixels;

for the first randomly chosen neighbor, assigning a weighting factor which is randomly selected;

randomly choosing other neighbors to the first pixel location from the first predetermined set, and assigning weighting factors to those locations that are randomly selected;

for the selected pixel neighbors, diffusing error values as follows:

$$e_j = (w_j)E_i$$

$e_j$ is the error value diffused to the jth pixel neighbor from the ith pixel where the jth pixel neighbor is randomly determined from a predetermined set of pixels neighboring the ith pixel, $w_j$ is the weight determined for the jth pixel location, and $E_i$ is the error value assigned to the ith pixel location;

assigning revised gray-scale values to the selected neighbor pixels such that the revised gray-scale values equal the detected gray-scale values plus the diffused gray-scale values; and printing images by digital halftone printing based upon intensity values of pixel locations that have been modified by error diffusion.

12. A digital halftoning process according to claim 11 wherein the predetermined set of neighbor pixels comprises pixels that are immediately adjacent neighbors.

13. A digital halftoning process according to claim 11 wherein the predetermined set of neighbor pixels comprises the pixel that immediately follows a selected pixel, a pixel immediately below the selected pixel, and the pixels that immediately precede and follow the pixel immediately below the selected pixel.

14. A digital halftoning process with random error diffusion for reducing visually apparent artifacts in images that are produced by digital halftone printing, comprising the steps of:

detecting intensity values of an image at selected pixel locations;

for a selected pixel location, encoding the pixel location as one binary value when the detected intensity value at the location is less than a predetermined threshold value, and assigning an error value $E_{x,y}$ to the pixel location equal to the detected intensity value;

when the detected intensity value at the selected pixel location is greater than the threshold value, encoding the pixel location as a second binary value and calculating an error value for the pixel location that equals the detected intensity value less the upper limit of the intensity scale;

randomly choosing a first adjacent neighbor pixel to the selected pixel location where the adjacent neighbor is one of four pixels comprised of the set that includes the pixel which immediately follows the selected pixel, the pixel immediately below the first pixel, and the pixels which immediately precede and follow the pixel immediately below the selected pixel;

for the first randomly chosen adjacent neighbor pixel, assigning a weight $w_{di}$ which is randomly selected from a distribution of numbers between 0.0 and 1.0;

randomly choosing a second adjacent neighbor to the first-selected pixel location where the second chosen adjacent neighbor pixel is one of the three remaining pixels of said set;

for the second chosen adjacent neighbor pixel, assigning a weight $w_{dj}$ which is randomly selected from a distribution of numbers between 0.0 and $(1.0 - w_{di})$;

randomly choosing a third adjacent neighbor to the initially-selected pixel where the third chosen adjacent neighbor pixel is one of the two remaining pixels of said set;

for the third randomly chosen adjacent neighbor pixel, assigning a weight $w_{dk}$ which is randomly selected from a distribution of numbers between 0.0 and $(1.0 - w_{di} - w_{dj})$;

determining the one remaining pixel of said set and assigning a weight $w_{dl}$ to it where $$w_{dl} = 1 - w_{di} - w_{dj} - w_{dk};$$

for the first, second, third and fourth neighbor pixels, determining respective error values as follows:

$$e_1 = (w_{di})E_{x,y}$$

$$e_2 = (w_{dj})E_{x,y}$$

$$e_3 = (w_{dk})E_{x,y}, \text{ and}$$

$$e_4 = (w_{dl})E_{x,y};$$

assigning revised gray-scale values to the first, second, third and fourth adjacent neighbor pixels, respectively, as follows:

$$\text{pixel}'_{(x+1,y)} = \text{pixel}_{(x+1,y)} + e_1$$

$$\text{pixel}'_{(x+1,y+1)} = \text{pixel}_{(x+1,y+1)} + e_2$$

$$\text{pixel}'_{(x,y+1)} = \text{pixel}_{(x,y+1)} + e_3 \text{ and}$$

$$\text{pixel}'_{(x+1,y+1)} = \text{pixel}_{(x-1,y+1)} + e_4$$

where the primes indicate the revised gray-scale values of the pixel locations;

continuing the above-described error diffusion process as subsequent pixel locations are scanned; and printing based upon the diffused error values.

15. A digital halftoning process according to claim 14 wherein the distribution of numbers is an even distribution.

* * * * *

UNITED STATES PATENT AND TRADEMARK OFFICE
CERTIFICATE OF CORRECTION

PATENT NO. : 5,051,841
DATED : September 24, 1991
INVENTOR(S) : BOWERS et al.

It is certified that error appears in the above-identified patent and that said Letters Patent is hereby corrected as shown below:

Column 1, line 56, following "1987)," insert --pp.--.

Column 1, line 64, following "values" insert --.--, a period.

Column 3, line 32, following "weight" delete "$w_{di}$" and insert therefor --$w_{dl}$--.

Column 6, line 29, delete "$pixel'_{(x+1,y+1)}=pixel_{(x,y+1)}+e3$" and insert therefor --$pixel'_{(x,y+1)}=pixel_{(x,y+1)}+e_3$--.

Column 6, line 32, delete "$pixel'_{(x+1,y+1)}=pixel_{(x-1,y+1)}+e_4$" and insert therefor --$pixel'_{(x-1,y+1)}=pixel_{(x-1,y+1)}+e_4$--.

Column 8, line 47, delete "$(1.0-w_{dj})$" and insert therefor --$(1.0-w_{di}-w_{dj})$--.

Column 9, line 17, before "$e_j$ is the" insert --where--.

Column 10, line 49, delete "$pixel'_{(x+1,y+1)}=pixel_{(x-1,y+1)}+e_4$" and

UNITED STATES PATENT AND TRADEMARK OFFICE
CERTIFICATE OF CORRECTION

PATENT NO. : 5,051,841

DATED : September 24, 1991

INVENTOR(S) : Bowers, et. al.

It is certified that error appears in the above-identified patent and that said Letters Patent is hereby corrected as shown below:

insert therefor --$pixel'_{(x-1,y+1)} = pixel_{(x-1,y+1)} + e_4$--.

Signed and Sealed this

Twenty-fifth Day of May, 1993

Attest:

MICHAEL K. KIRK

Attesting Officer     Acting Commissioner of Patents and Trademarks